United States Patent
Jogand-Coulomb et al.

(10) Patent No.: US 12,039,026 B2
(45) Date of Patent: Jul. 16, 2024

(54) PROVISIONING BIOMETRICS TOKENS

(71) Applicants: ASSA ABLOY AB, Stockholm (SE); HID Global CID SAS, Suresnes (FR)

(72) Inventors: Fabrice Jogand-Coulomb, Aix en Provence (FR); Calum Bunney, Marstrand (SE); Caleb Wattles, Paris (FR)

(73) Assignees: ASSA ABLOY AB, Stockholm (SE); HID Global CID SAS, Suresnes (FR)

( * ) Notice: Subject to any disclaimer, the term of this patent is extended or adjusted under 35 U.S.C. 154(b) by 337 days.

(21) Appl. No.: 17/596,998

(22) PCT Filed: Jun. 25, 2020

(86) PCT No.: PCT/EP2020/067879
§ 371 (c)(1),
(2) Date: Dec. 22, 2021

(87) PCT Pub. No.: WO2020/260483
PCT Pub. Date: Dec. 30, 2020

(65) Prior Publication Data
US 2022/0300592 A1 Sep. 22, 2022

(51) Int. Cl.
*G06F 21/32* (2013.01)
*G06F 21/64* (2013.01)
(Continued)

(52) U.S. Cl.
CPC .............. *G06F 21/32* (2013.01); *G06F 21/64* (2013.01); *H04L 9/0825* (2013.01);
(Continued)

(58) Field of Classification Search
CPC .......... G06F 21/32; G06F 21/64; G06F 21/31; H04L 9/0825; H04L 9/3213;
(Continued)

(56) References Cited

U.S. PATENT DOCUMENTS

2018/0302217 A1* 10/2018 Hevia Angulo ........ H04L 9/085
2019/0215164 A1* 7/2019 Hamann ................ H04L 9/0894
2020/0065463 A1* 2/2020 Ryu ........................ G06V 40/10

FOREIGN PATENT DOCUMENTS

| EP | 2075734 A1 | 7/2009 |
| WO | WO-2018089098 A1 | 5/2018 |
| WO | WO-2020260483 A1 | 12/2020 |

OTHER PUBLICATIONS

"International Application Serial No. PCT/EP2020/067879, International Preliminary Report on Patentability dated Jan. 6, 2022", 9 pgs.

(Continued)

*Primary Examiner* — Malcolm Cribbs
(74) *Attorney, Agent, or Firm* — Schwegman Lundberg & Woessner, P.A.

(57) ABSTRACT

A computing device implemented method of identity authentication comprises receiving a biometric token; performing a biometric capture of a user; converting the biometric capture into a biometric bitstream; recovering a predictable seed of data using the biometric bitstream and the biometric token; using the recovered predictable seed of data to produce challenge response data sent to a verifier device in response to a challenge message received from the verifier device; and verifying the challenge response data using identity data of the user.

20 Claims, 12 Drawing Sheets

(51) Int. Cl.
*H04L 9/08* (2006.01)
*H04L 9/32* (2006.01)

(52) U.S. Cl.
CPC .......... *H04L 9/3213* (2013.01); *H04L 9/3231* (2013.01); *H04L 9/3271* (2013.01)

(58) Field of Classification Search
CPC . H04L 9/3231; H04L 9/3271; H04L 63/0428; H04L 63/08; H04L 63/0823; H04L 63/0861; H04L 63/0876; H04L 63/12; H04L 63/126
See application file for complete search history.

(56) References Cited

OTHER PUBLICATIONS

"International Application Serial No. PCT/EP2020/067879, International Search Report dated Sep. 24, 2020", 4 pgs.
"International Application Serial No. PCT/EP2020/067879, Written Opinion dated Sep. 24, 2020", 7 pgs.
"Working Draft text for ISO/IEC 2nd WD 24745—Information technology—Security techniques—Biometric information protection", ISO/IEC, 26th SC 27/WG 5, Gjovik, Norway, (Dec. 18, 2018), 61 pgs.

* cited by examiner

PROVISIONING BIOMETRICS TOKENS

PRIORITY APPLICATION

This application is a U.S. National Stage filing under 35 U.S.C. § 371 of PCT Patent Application No. PCT/EP2020/067879, filed on Jun. 25, 2020, which claims priority to U.S. Provisional Patent Application No. 62/866,254, filed Jun. 25, 2019, the disclosures of which are incorporated by reference herein in their entirety.

TECHNICAL FIELD

Embodiments illustrated and described herein generally relate to systems that identify users for access to secure resources, and in particular to systems and methods for authentication using identity data and biometrics tokens.

BACKGROUND

There are many applications for which quick and accurate authentication of identity of a person is desirable. Some examples include airline travel and secure access to controlled areas. Additionally, remote identity authentication for applications such as mobile online shopping or mobile banking is now a common practice. Remote authentication often involves authentication information being exchanged between a user's mobile phone and a server performing authentication. Unfortunately, attempts to defeat systems that provide secure authentication occur often. It is desirable to develop authentication practices that are difficult to defeat.

DETAILED DESCRIPTION

It is desirable to authenticate a person's identity for various device-implemented transactions. This authentication could be for provisioning an identity document to a mobile device or simply for authentication to online services. Biometrics is a good solution to confirm identity for the right person. Biometrics refers to measured physical characteristics unique to a person that can be used to verify the identity of the person. Typical methods rely on a biometric reference or a database of biometric references. These methods are not ideal because either the biometric reference is at risk when sent to the user mobile device, or the biometric capture is at risk when sent to the authentication system to compare with biometric reference in a database. Exchanging a biometric capture or a biometric reference between devices increases the risk of biometric to be compromised.

A renewal biometric reference is an alternative that provides a solution where the biometric reference is bound to information that can be revoked. This technique turns a biometric capture into a bitstream that can be combined with reproducible or predictable data. The predictable data can be referred to as a predictable seed useable for authentication. For example, the predictable seed of data can be used as secret data or as a key to encrypt, decrypt, or sign data as a means to enforce access control, prove identity, and the like. Combining the biometric bitstream and the predictable seed of data produces a biometrics token (sometimes referred to as a Renewable Biometric Reference, or RBR). A subsequent biometric capture can be used to recover the predictable seed of data from the biometrics token.

Figure 1:
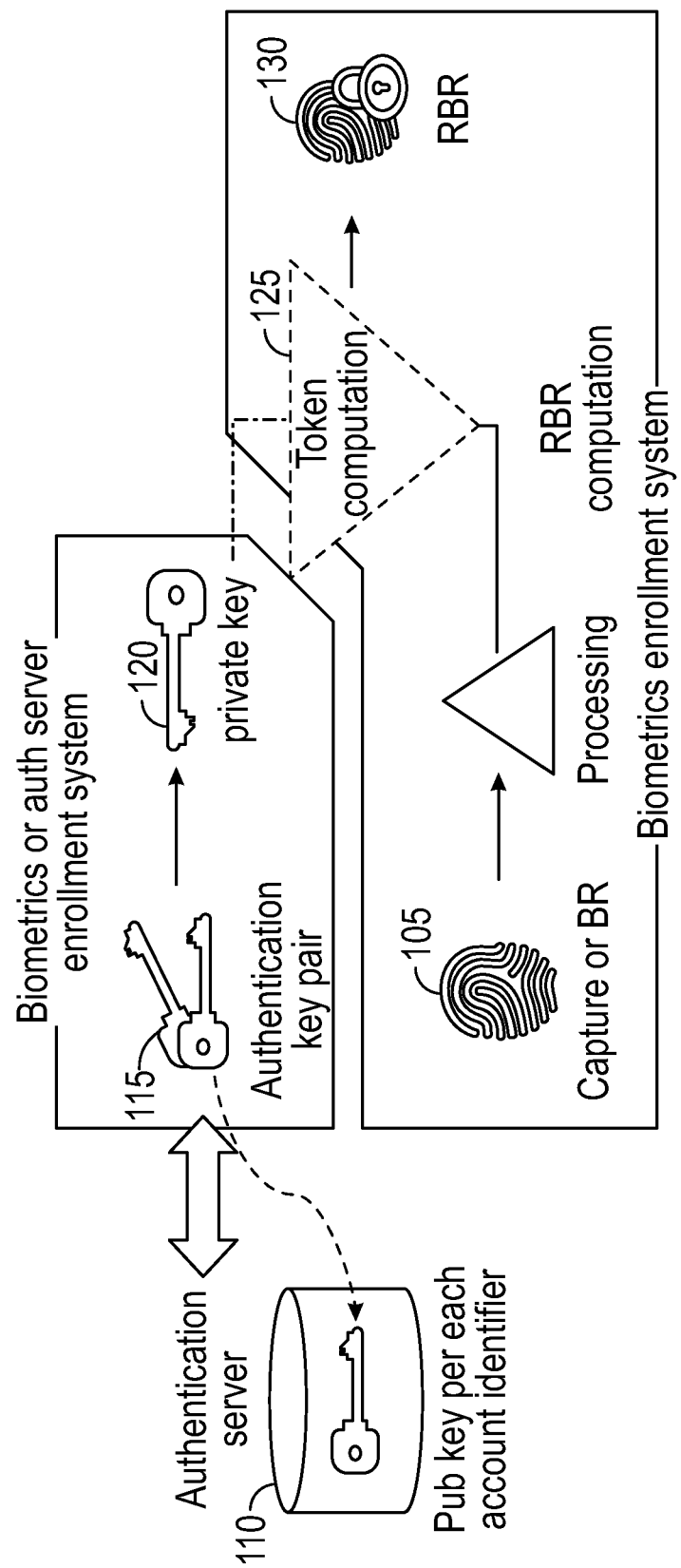
FIG. 1 is an illustration of a process to generate a biometrics token using an authentication key.

FIG. 1 is an illustration of a process to generate a biometrics token. In the process, a biometric (e.g., a fingerprint image or facial image) of a user is captured. The biometric capture 105 is converted through data processing into a biometric bitstream. An authentication key pair 115 is generated by a verification device that may be an authentication server 110. The authentication key pair 115 may include a public key and private key. The private key 120 of the key pair and the biometric bitstream are run through an algorithm 125 to generate a biometrics token 130. In some examples, the algorithm 125 is an error correction code (ECC) algorithm. Any algorithm can be used that generates an encoding from which the original bitstream of the biometric capture can be recovered. The biometrics token can then be sent to another device (e.g., a credential device) where the private key can be recovered from the biometrics token.

Figure 2:
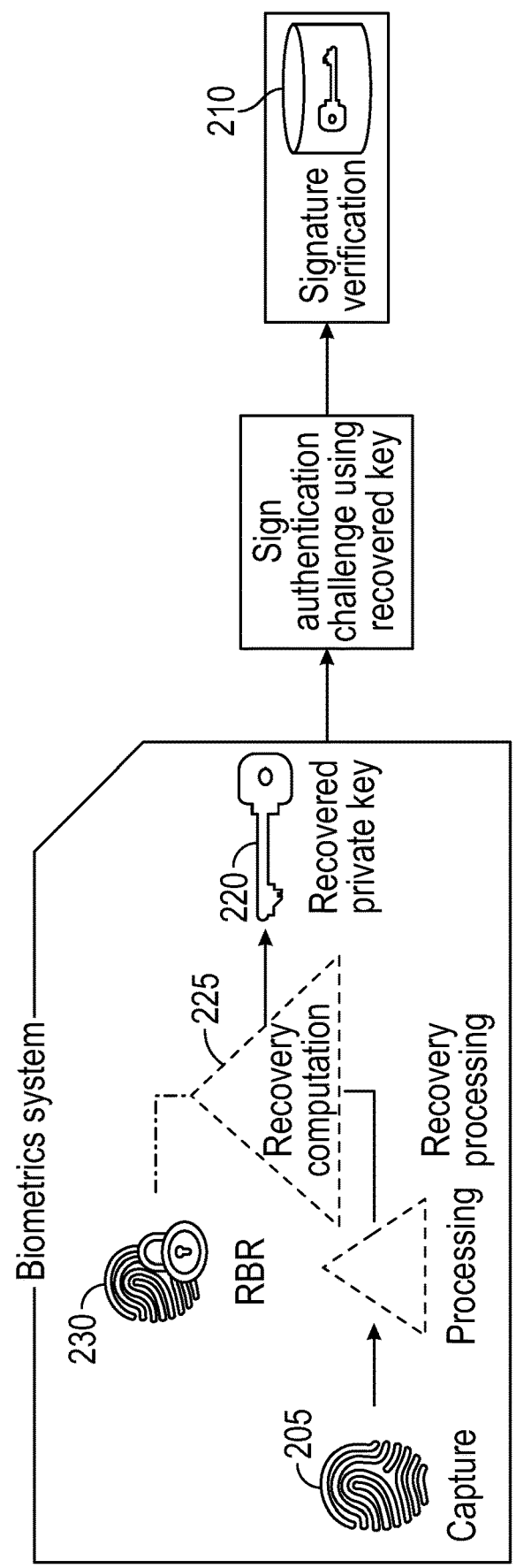
FIG. 2 is an illustration of a process to recover an authentication key from a biometrics token.

FIG. 2 is an illustration of a process to recover secret data (e.g., a private key) from a biometrics token 230. The process may be performed using a credential device. In the example, the secret data is a private key 220. A new capture of the user biometric 205 is converted into a new biometric bitstream. A recovery calculation is used to recover the key from the biometrics token 230 and the new biometric bitstream. Using another bitstream may lead to a different key that isn't paired with the public key and accordingly whose signature would fail to verify. In some examples, the biometrics token 230 and the new biometric bitstream are run through the ECC algorithm used to generate the biometrics token 230. Running the biometrics token 230 and the biometric predictable seed through the ECC algorithm recovers the private key 220.

The use of biometrics tokens to authenticate identity provides the advantage of binding remote authentication to the biometrics of the user. Using the biometrics token 230 allows recovery of the secret data from the biometric capture 105 in FIG. 1. This method ensures that no biometric reference or capture which could compromise the biometrics is exchanged between the mobile device and the authentication server, and furthermore the method reduces the risk regarding the authentication key as the key is only present during authentication and after a biometric capture of the correct person.

The recovered secret data can be used to fulfill access rights to use, access another secret, or used directly as an authentication credential. For example, in FIG. 2 the recovered key can be used to sign an authentication challenge received from the authentication server. In variations, the challenge could be replaced by signing session information or other data that can be verified by the authentication server. The signed challenge is returned to the authentication server 210 for verification. The secret data can be used as a substitute or replacement for a personal identification number (PIN). The secret data can be used to decrypt other data or secret (e.g., personal data).

Some use case examples of using a biometrics token for authentication are described. The biometrics token is used to confirm biometrics of the person without sharing biometrics and other personal identification information (PII) to untrusted entities.

Figure 3:
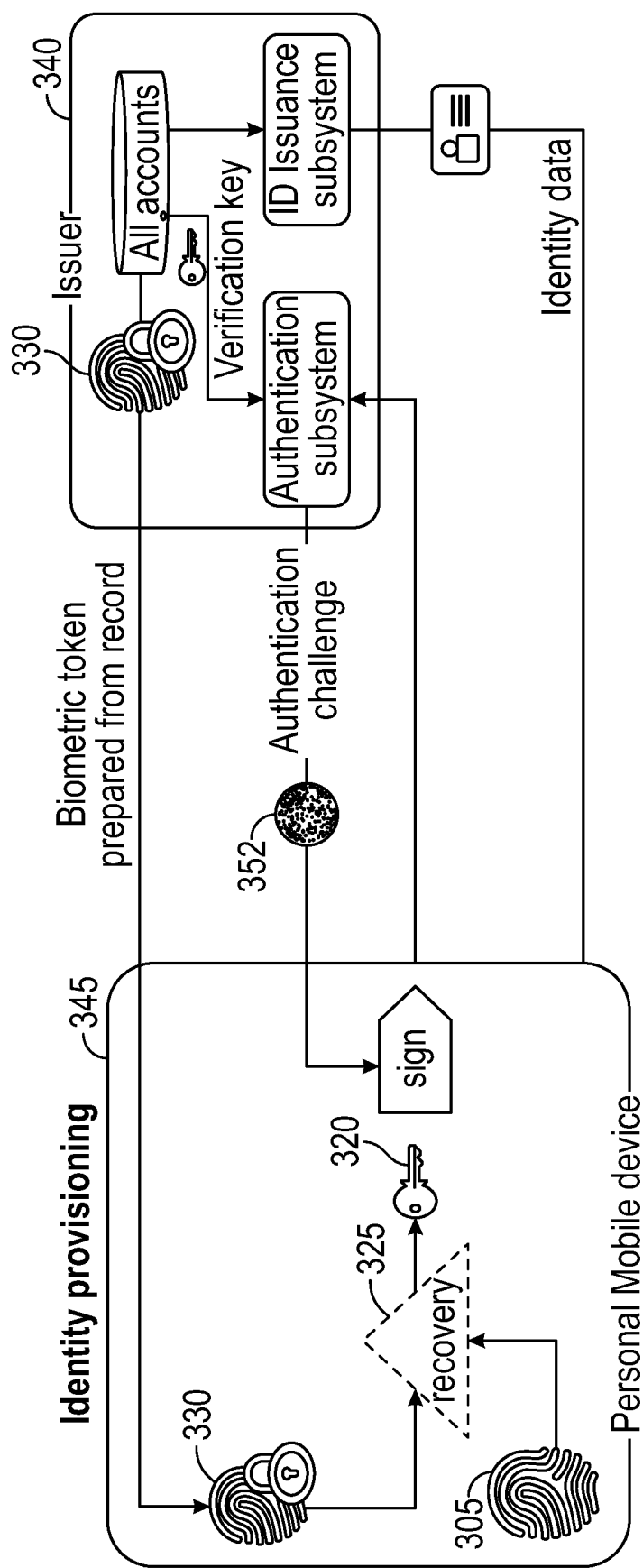
FIG. 3 is block diagram of an authentication system useable to provision identity information to a credential device.

FIG. 3 is block diagram of an authentication system 300 useable to provision identity information to a credential device. The provisioning of the identity data includes using a biometrics token 330 to confirm that the person matches the identity data to provision. The authentication system includes a verifier device 340 that distributes the secure information. In some examples, the verifier device 340 is an authentication server of the authentication system. The secure information is distributed to a credential device such as a client application, or an App 345, of a user's smartphone or a tablet computer.

As more and more functions are performed by smartphones, it is desirable to store government issued identity information on a smartphone. The authentication process allows for identity information to be issued to the smartphone. The identity of the user of the smartphone is verified before issuing the identity information or reissuing the identity information.

Figure 4:
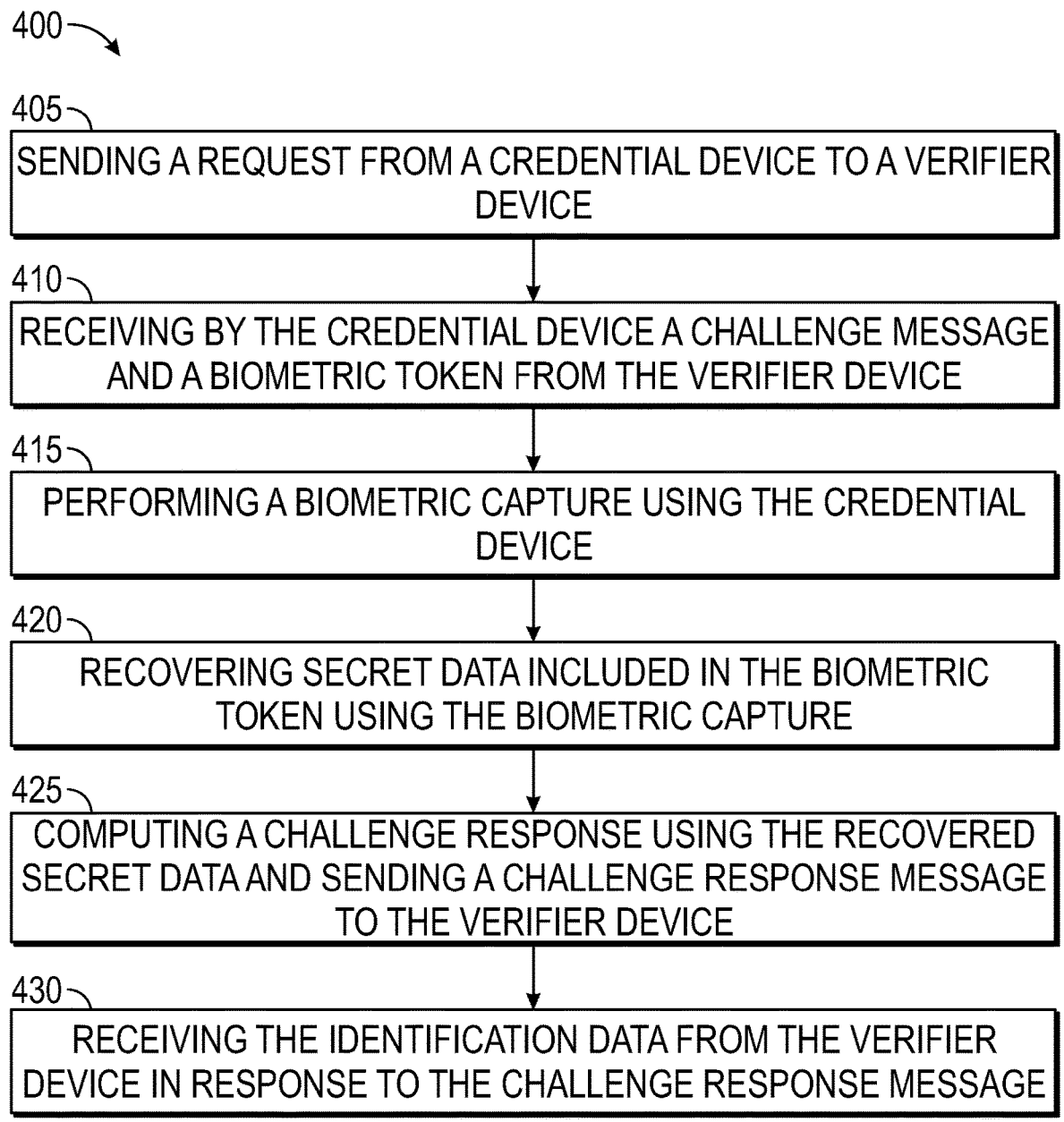
FIG. 4 is a flow diagram of a method to confirm the identity of the user of a credential device using a biometrics token.

FIG. 4 is a flow diagram of a method to confirm the identity of the user of a credential device using a biometrics token. The method 400 may be performed using the authentication system 300 of FIG. 3. The user of the credential device has enrolled with an issuer of identify information (e.g., passport information, bank account information, or other personal information) and the issuer has collected additional out of band (OOB) identification data such as the user's email address or cell phone number.

At 405, a request message is sent from the credential device (e.g., a smartphone that includes the App 345 of FIG. 3) to the verifier device 340. The request may be for the system to provision identity information to the smartphone. In response to the request, at 410 the credential device receives a message with information on how to continue the process to receive the requested identity information. The information received from the verifier device 340 may include a challenge message 352 and a biometrics token 330. The biometrics token 330 may be a one-time-use biometrics token that is valid for only a predetermined limited time. The process may be combined with an OOB message sent to the email address or cell phone number in order to increase the level of assurance. For example, one or both of the biometrics token and the challenge may be received in an OOB message. A decryption seed may also be sent using an OOB message if the biometric token is sent encrypted.

The biometrics token 330 included in the information may be computed by the verifier device 340 using the process of FIG. 1. The verifier device 340 may produce the biometrics token 330 using a biometric capture of the user. The biometric capture may be produced from a biometric (e.g., a facial image or fingerprint image) stored in memory of the verifier device 340.

At 415, the credential device performs biometric capture of the user. This biometric modality should be as expected from the token sent by the verifier device 340 (e.g., the facial image). If the credential device is a smartphone, the App 345 in FIG. 3 may present instructions on how to perform biometric capture using the smartphone. For example, the App 345 may display instructions to use the smartphone camera to capture a facial image and then extract the biometric information.

At 420, the biometric capture 305 produced by the credential device is used to recover secret data 320 (e.g., a signature key) included in the biometrics token 330 received from the verifier device 340. The credential device may use processing to convert the biometric capture 305 into a biometric bitstream 312. To recover the secret data 320, the credential device may run the biometrics token 330 and the biometric bitstream 312 through an ECC algorithm 325 that was used to generate the biometrics token. The secret data may include a signature key or a split key.

At 425, challenge response data is computed using the recovered secret data. The challenge response data may include the digital signature of the challenge using the recovered secret data as a signature key or spit signature key. The signature may follow a private key algorithm (e.g., a Rivest Shamir Adleman (RSA) algorithm) or another algorithm allowing for signature with splits keys (e.g., threshold cryptography, Shamir secret sharing etc.). In the algorithm with split key signature, the digital signature may include a further signature using a key held by the credential device that was not recovered from biometrics token and for example protected from cloning allowing to use the credential device as an authentication factor (something you have). This would be the case when provisioning to a device that has already been registered to the person's identity. A challenge response message is sent from the credential device to the verifier device. The verifier device 340 verifies the challenge response data by verifying the digital signature of the challenge response data over a public key associated with the biometric token. In some examples, the verification includes verifying a digital signature of the challenge response data over a public key included in the identity data of the user.

If the signature is valid, this verifies that the credential is under the control of the person matching the identity data to provision. At 430, the verifier device proceeds with the issuing the identity data to the credential device, and the credential device receives the identity data from the verifier device.

Figure 5:
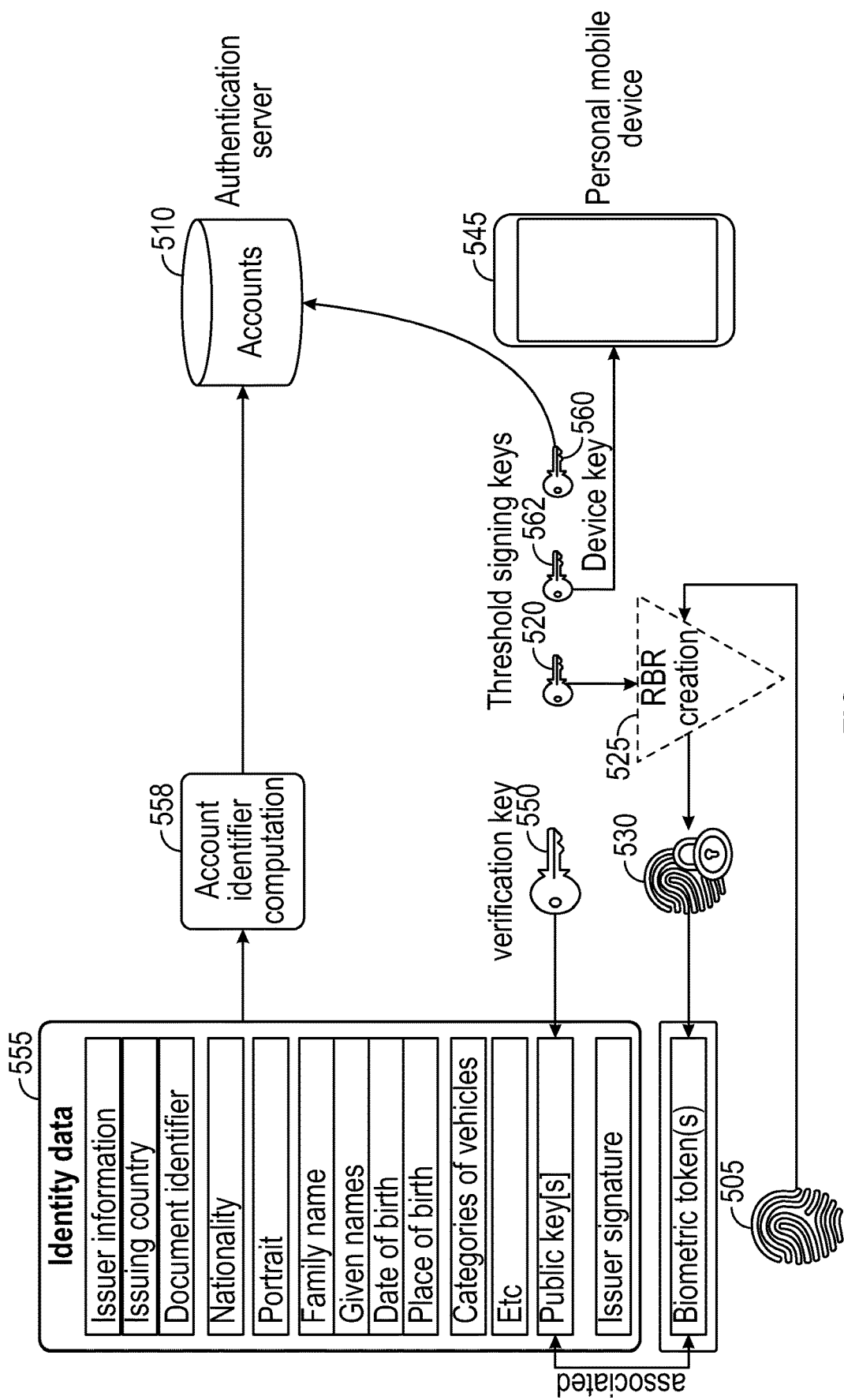
FIG. 5 is an illustration of an example of an authentication system.

FIG. 5 is an illustration of an example of an authentication system 500 useable to generate identity documentation for the user. The identity documentation can be used to authenticate the user and may be the identity data described previously herein in regard to the system and method examples of FIGS. 3 and 4. In FIG. 5, the issuer may provision the identity on a device where the device key is a threshold key along with a key recovered from a biometric token, which may be combined with a server key when the issuer performs the authentication. Alternatives may exist where the server key is stored at an independent authentication service. In a further embodiment, only a subset of the threshold keys is required for a signature to be valid.

FIG. 5 shows an example of the identity data 555. A subset of the information from the identity data 555 is used to compute an account identifier 558 for a secure account of the user. For example, the account identifier could be computed using information that remains unchanged from one identity document to another (e.g., information that is unchanged between a newer and older driver's license, or between a driver's license and a passport, such as name, date of birth, city of birth, etc.). As this information may not be unique (for example another person could have same name, birthdate and birth city), the information could be used as a seed to look up for the actual account in combination with other information such as biometrics or signature verification.

The verification data may be a public verification key 550 used to verify the signature from using the split keys. The association by the identity data issuer of the verification data to the identity data of the user allows confirmation of identity. Optionally, the account of the user can be loaded with a split private key 560 to complete the digital signature and a verification key 550 is received during authentication of the credential device 545 along with the identity data 555. In some examples, the account could be loaded with the signature verification key 550 instead. Using a split private key 560 on the authentication server 510 to complete the signature facilitates fraud detection and increases security because without the split private key 560 the public key can't be matched to the other signing keys residing on the credential device that are more vulnerable.

Authentication of the user's identity is often split into three broad categories: "something you know," "something you have," or "something you are." In the example of FIG. 5, another split key (or device key 562) is generated on the credential device 545 where it could benefit from cloning protection. The device key 562 may generated as part of the identity data provisioning in response to authentication of the credential device 545. This allows the credential device 545 to provide the "something you have" authentication category. Also, in FIG. 5, still another split key 520 is encoded into a biometric token 530. This split key 520 will be recovered from biometrics capture on the credential device 545 and can provide the "something you are" authentication category.

Another use case example for a biometrics token is in-person identification of the user. The identification involves the identity information being sent from the credential device of the user to the verifier device.

Figure 6:
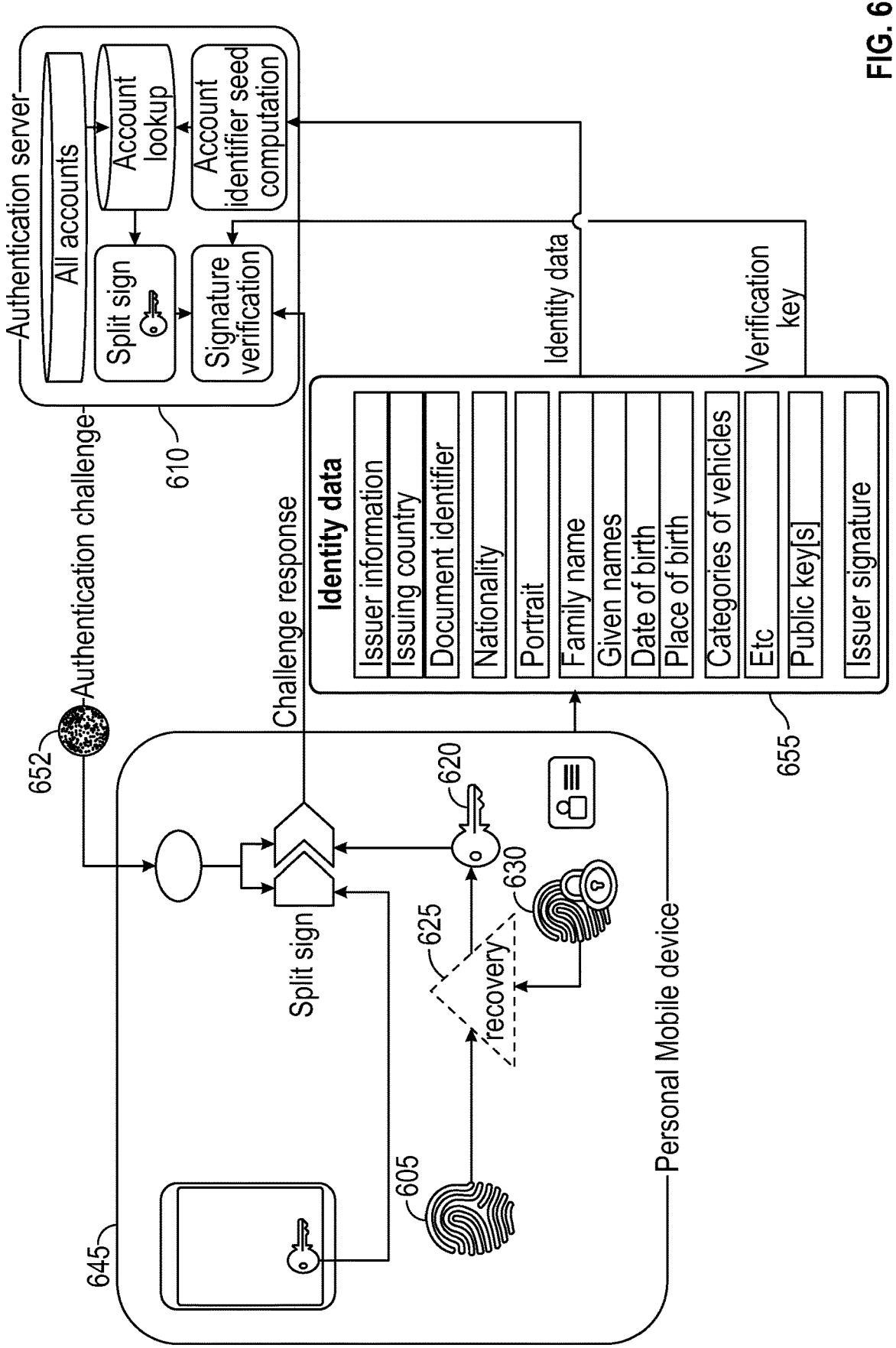
FIG. 6 is an illustration of another example of an authentication system.

FIG. 6 is an illustration of an example of an authentication system useable to authenticate the credential device of the user using identity data provisioned to the credential device as described previously herein in regard to the examples of FIGS. 3 and 4. The credential device is a smartphone App 645 provisioned with the identity data 655 and a biometrics token 630 is used in the authentication.

Figure 7:
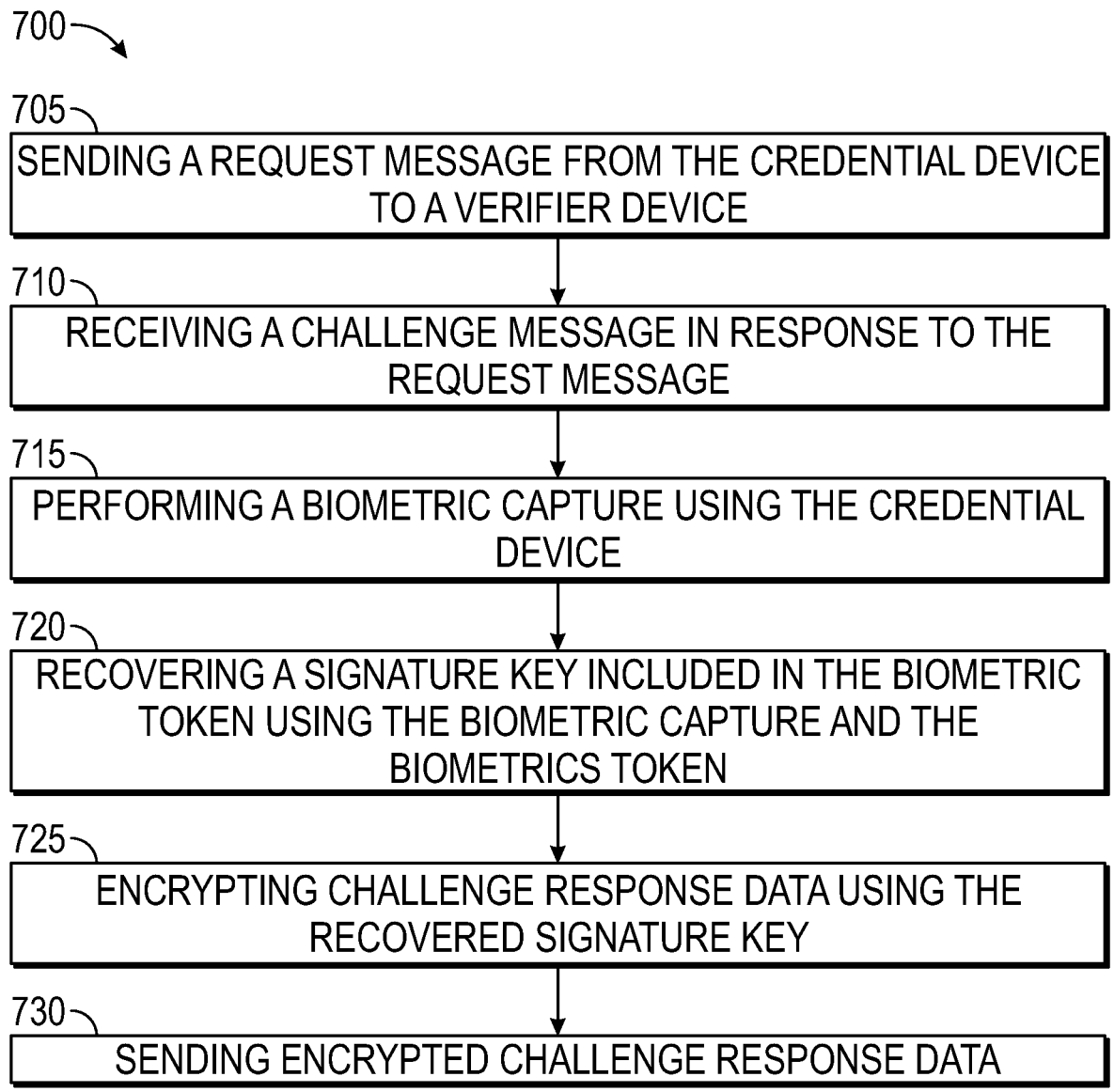
FIG. 7 is a flow diagram of an example of a method to identify the user of a credential device using a biometrics token.

FIG. 7 is a flow diagram of an example of a method to identify the user of a credential device using a biometrics token. The method 700 may be performed using the authentication system of FIG. 6.

At 705, a request message is sent from the credential device to engage the verifier device (e.g., an authentication server 610 of the authentication system of FIG. 6, or a reader device of a physical access control system). The request message may be to access a secure resource (e.g., a secured account of the user of the credential device). The request may initiate a discovery process between the devices. At 710, the verifier device encodes and sends a challenge message to the credential device in response to the message from the credential device. In some examples, the challenge message includes an authentication challenge.

At 715, as shown in FIG. 6 the credential device produces a biometric capture 605 of the user. At 720, the credential device performs a recovery computation 625 using the biometric capture 605 and the biometrics token 630 to recover a signature key 620 included in the biometrics token 630. The biometrics token 630 may be received previously when the credential device was authenticated, or the biometrics token 630 may be sent with the challenge message.

At 725, challenge response data is encrypted using the recovered signature key. In some examples, the challenge response data includes the authentication challenge that is digitally signed by the credential device using one or more split keys. One of the split keys may be recovered from the biometrics token which may have been provisioned along with the identity data. Another one of the split keys may be a device key allowing to use the device as an authentication factor.

At 730, the credential device sends encrypted challenge response data to the verifier device. Identity data for identity verification and the challenge signed by the credential device are returned to the verifier device in a challenge response. The verifier device uses the identity data to compute the seed to recover the account identifier of the user. If more than one account matches, then other information could be used to confirm the match. For example, the digital signature could be completed using the private key included in the account and then verified. Accordingly, a match to a single account is confirmed and the user has been both identified and authenticated.

The user may be then given access to the account or other secure resource. Using the biometrics token ensures that the capture of the biometric is genuine. It also provides a verification process that doesn't threaten the security of the PII or biometrics of the identified person. The verifier device may be connected to the Internet and able to interface with another backend system, and another device verifies the user from the identity data. In another example, the verifier device performs the verification on its own without relying on another device of the authentication system.

In some examples, the communication between the verifier device and the credential device is via a wireless network. In some examples, the communication between the verifier device and the credential device is via the Internet (e.g., online communication). To provide additional security such as for communication via the Internet, the recovered secret data may include a private key of an authentication key pair. The private key is used to encrypt one or both of the response message and the identity data. The verifier device receives the response message, checks the issuer signature, and may then contact a service to complete the signature. The verifier device verifies the signature using a public key of the authentication key pair. In certain examples, the communication is further secured against fraud using a private key that is a split key including a first private key and a second private key. The identity data can be encrypted using the first private key. Additional identity information (e.g., a PIN) can be encrypted using the second private key and included in the identity data encrypted using the first private key.

Figure 8:
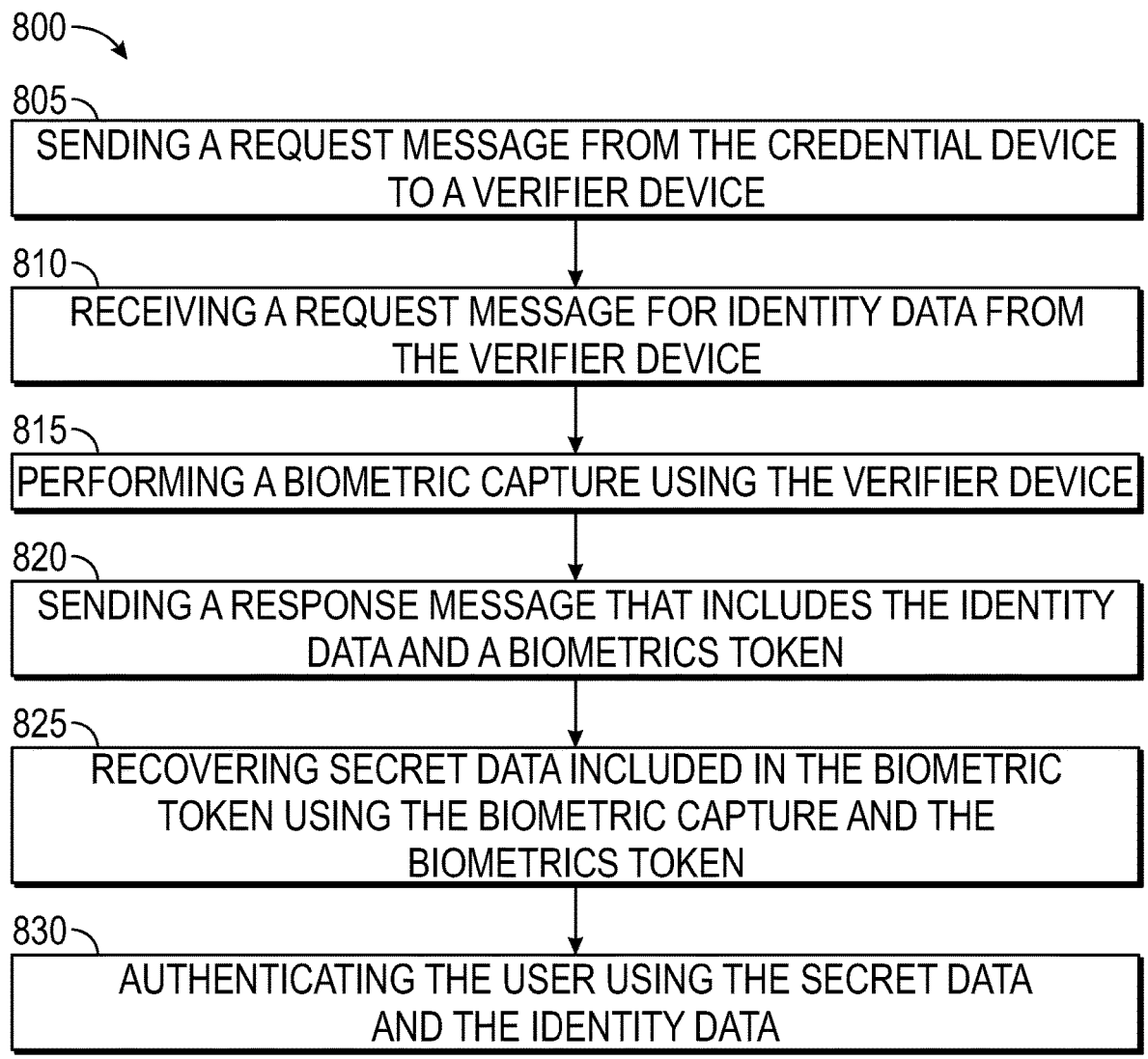
FIG. 8 is a flow diagram of another example of a method to identify the user of a credential device using a biometrics token.

FIG. 8 is a flow diagram of another example of a method to identify the user of a credential device using a biometrics token. Again, the method 800 may be performed using the authentication system of FIG. 6. At 805, a request message is sent from the credential device to engage the verifier device. At 810, in response to the first message, the verifier device sends a message to the credential device requesting identity data.

The request message may include confidence data or other authentication assurance information that the verifier device is authorized for biometric capture. In some examples, the confidence data includes a minimum biometrics authorization assurance level (BAAL). In some examples, the confidence data includes a minimum identification assurance level (IAL). The verifier device uses the confidence data to determine if it is authorized as a trusted device for producing the biometric capture.

At 815, the verifier device produces a biometric capture of the user (e.g., using a camera or other sensor). The credential device may use the confidence data to check an authorization list that indicates that the user consents with the kind of biometrics capture (e.g., facial image capture) to be performed and may inform the user accordingly. The credential device may present instructions to the user for the biometrics capture by the verifier device (e.g., where to be positioned for a photograph or to allow a fingerprint scan by the verifier device).

At 820, the credential device sends a response message to the verifier device. The response message includes the identity data and includes the biometrics token. The biometrics token may be a one-time-use biometrics token. In some examples, the credential device is a smartphone and an App executing on the smartphone generates the one-time-use biometrics token. In some examples, the biometrics token is received and stored during secured provisioning of identity data to the credential device.

At 825, secret data is recovered by the verifier device using the biometric capture and the biometrics token. In some examples, the secret data is a signature key used to authenticate the biometric capture. At 830, the verifier device authenticates the identity of the user using the identity data.

As in the examples regarding FIG. 7, the communication between the verifier device and the credential device may be via a wireless network or may be online via the Internet. The secret data recovered by the verifier device can include a private key of an authentication key pair, or a split private key. Different levels of encryption can be used for the identity data of the response message using private keys or split private keys.

The methods described regarding FIGS. 7 and 8 can be used for in-person authentication for airline travel. Currently, airline travel providing identification data at check in and getting verified at the airport. Facial recognition is increasingly being used for verification during airline travel. If the travel is international, multiple verifications are used in which identity data is disclosed and facial recognition is matched to the provided identity data.

Using the biometrics techniques described herein can ensure that identity data of the traveler is communicated only once for the entire journey with verification performed ahead of time and confirmation by facial recognition is performed at each new airport or border without having to re-disclose the identity data. This adds a layer of protection of the PII of the traveler.

For example, the traveler may check in online or at a kiosk and provide issued identity data using the traveler's smartphone that includes an App for securely transferring the identity data using biometrics tokens. At the airport, the traveler receives a request on the smartphone from a verifier device authorized to collect biometrics for the issued identity data for the entire trip. After consent is shown by the traveler, an optional low resolution portrait image, necessary identity elements, and irreversible and revocable biometrics are collected. The smartphone may present instructions to the traveler to perform the capture with the verifier device. The collected information is provided to the necessary authorities at airports along the trip. Verification status is provided to the airline and the airports. At each new airport, a biometric capture may be performed at a kiosk to confirm the match to the provided identity data. Thus, the number of times that the issued identity data is disclosed is reduced.

Privacy and data minimization are both important to modern identification methods. On one side, privacy ensures that traceability of the issued identity data is reduced and PII is properly protected. Data minimization ensures that only the minimum relevant data is shared during identity verification. The techniques described herein ensure that the biometrics information is not threatened by unpermitted disclosure. The low resolution portrait is sufficient to ensure recognition within a limited number of people. Other biometrics can be captured and tokenized to provide support for revocation of the biometrics. The biometrics tokens can be used for a single verification and then disposed of.

The user is informed about the request and what data is being collected. The request for identity data may specify the necessary factors that the verifier device expects or supports. The user either consents (e.g., using a smartphone) to return a response that includes the requested identity elements or doesn't consent. If the user consents and the identity data is provided, the verifier device checks the authenticity of the identity data and checks that the biometrics token is bound to the identity data. The verifier device uses biometric capture and the biometrics token to compute a private key and confirms the key patches the issuer signed public key.

The methods described regarding FIGS. 7 and 8 can be used for in-person identification for access to secure areas. For example, the verifier device may control or incorporate a secured door to provide physical access to the user of the credential device. For typical PAC systems, the person wishing to gain access supplies some parameter that is checked for authentication. Typical parameters are included in the categories "something you have" (e.g., a device identified by an ID or key that usually can't be extracted, or can't easily be extracted), "something you are" (e.g., a biometric such as a face image or fingerprint mage), or "something you know" (e.g., a PIN code, passphrase, secret, or other knowledge based verification). The biometrics token techniques described here can provide additional security to ensure a person is who they claim to be.

Figure 9:
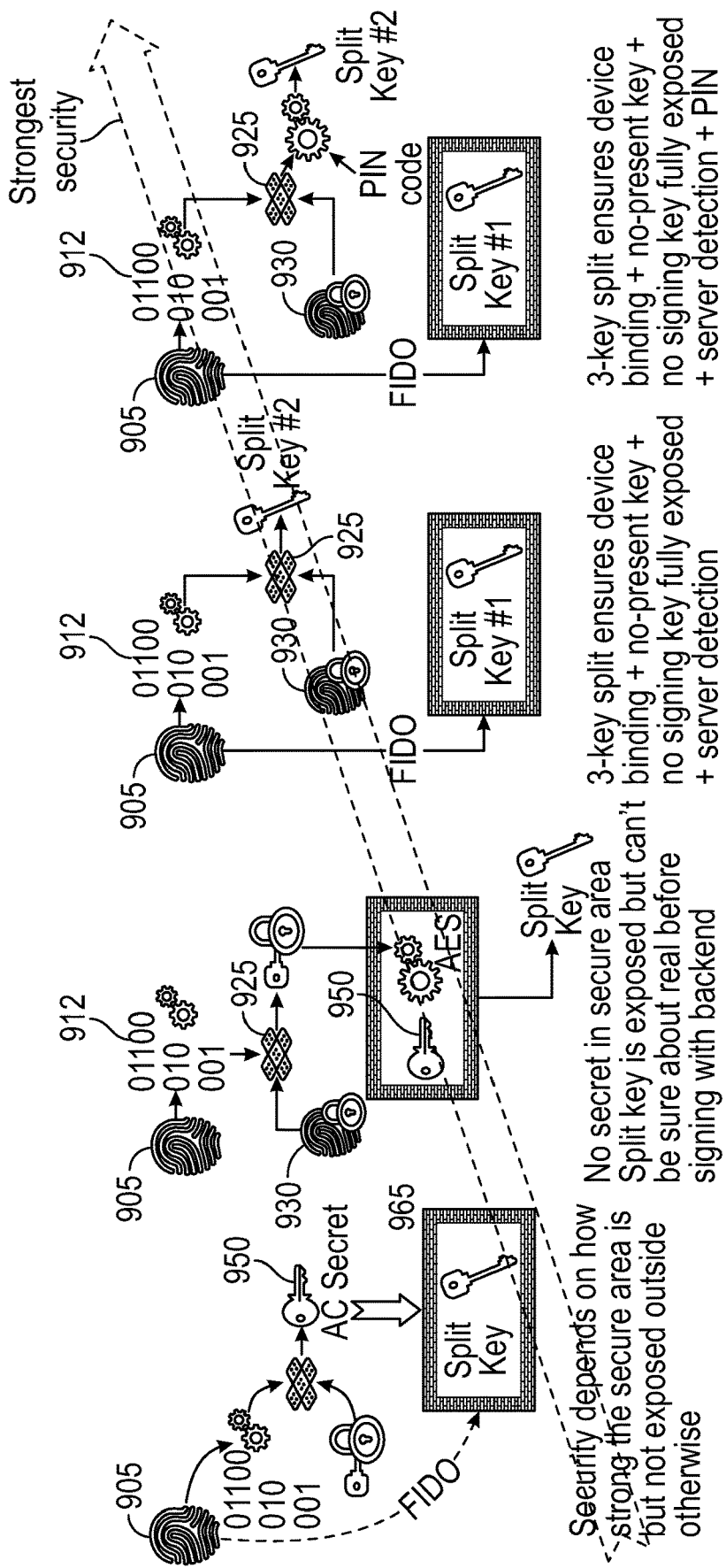
FIGS. 9A-9D show example methods that provide different levels of security using biometrics.

FIGS. 9A-9D show example methods that provide different levels of security using biometrics when granting physical access or when verifying the "something you have" device. In FIG. 9A, a biometric capture 905 and a signing key 950 are used with secret data 920 to access a secure split key. The split key can be a key pair with the signing key 950. The method of FIG. 9A involves some risks of fraud because the signing key is one authentication factor that is present on the credential device, and there is risk that the authentication factor could be extracted from the device. The security depends on how strong the secure area 965 (e.g., secure memory) is but the secure split key is not exposed otherwise.

In the method of FIG. 9B, a secret key 920 is included in a biometrics token 930. A biometric capture 905 is converted to a biometric bitstream 912 which is run through the algorithm 925 (that generated the biometrics token) with the biometrics token 930 to recover the secret key 920. An advanced encryption standard (AES) is used to access a split key. The method of FIG. 9B also involves risk because the signing key 950 may be exposed in memory after it is recovered from the biometrics token.

In the example of FIG. 9C, the method uses threshold cryptography and to some extent the Shamir secret sharing algorithm. The message signature relies on a key that is split into multiple key parts. In threshold cryptography, only a threshold number of keys (e.g., 2 of 3 keys) are needed for a valid signature rather all of the multiple keys and all of the multiple split key parts. Using a split key along with a biometrics token allows one part of the split key (Split Key #1) to be protected in hardware and while one part of the key (Split key #2) is only exposed after a biometrics capture (e.g., after a valid user holds or activates a user device). The part of the key protected in hardware could rely on biometrics access control. This could take advantage of Fast Identification Online (FIDO) authentication that provides the necessary hardware to secure the biometrics match prior to authorizing use of the key protected in hardware.

In the example of FIG. 9D, the method shown expands on the cryptography of the example of FIG. 9C by adding a PIN to the recovery of one part of the split key to ensure that all three authentication parameters (i.e., the something you have, something you are, and something you know identified above) are involved. Combining the three parameters can ensure that biometrics presentation is done consciously and, can at least ensure that, the user is aware and can act accordingly if forced to present the necessary information.

Combining a biometrics token with a split key presents additional advantages, as the key could be split further, and part of the key could be in the backend. This approach can ensure that signing for authentication can't be completed without the involvement of the authentication system backend. Combining a biometrics token with a split key prevents a brute force attack on the signature key because the keys of the user's device can't be matched to the public key without the key stored on the backend. It also provides additional fraud protection because the backend can check for parameters external to the user's device that can't be controlled by a fraudulent user. Furthermore, the verification may not require signing with all the keys. Leveraging threshold cryptography, it is possible to sign with two of the three keys. That would permit the identity issuer to leverage the server key during provisioning then keep the identity issuer off the hook using only the device key and the key recovered from the biometric token.

A challenge with device-based identity data is that the data will be matched at some point to the legitimate holder of the data. This introduces risk when the biometrics information to confirm the legitimate holder is delivered along with the identity data to authenticate the user. This information could be enough for a fraudulent user to impersonate the legitimate holder. When the identity data includes a biometrics token rather than a biometrics template, there is no information available in the identity data that can be used by a fraudulent user for impersonation. Additionally, the identity data can be revoked if compromised.

Figure 10:
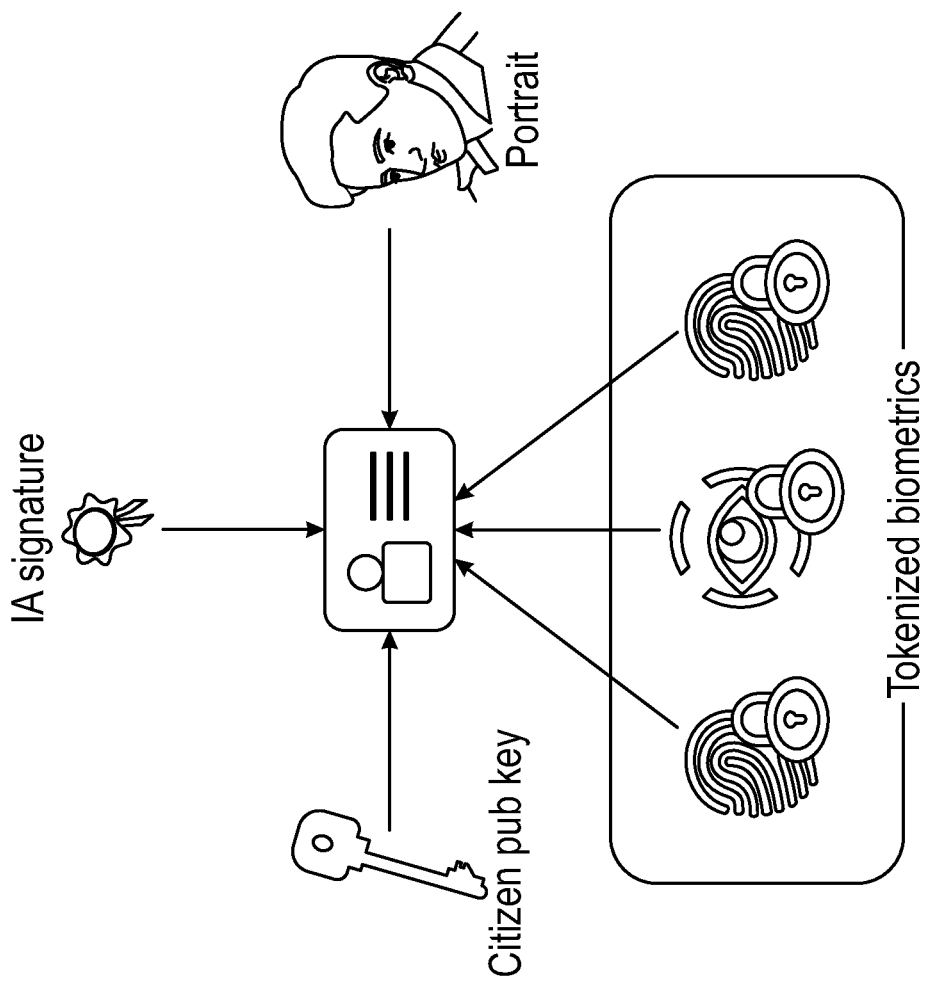
FIG. 10 is an illustration of an example of identity data that includes a biometrics token.

FIG. 10 is an illustration of an example of identity data that includes a biometrics token in identity data. The identity data may reside in the credential device after provisioning. The identity data may be used as an alternative to the user's portrait 1070 or to supplement identification by the portrait. A public key 1050 of the user's device is included in identity information to ensure the binding between the key recovered from the biometrics token 1030 and the identity of the user.

Figure 11:
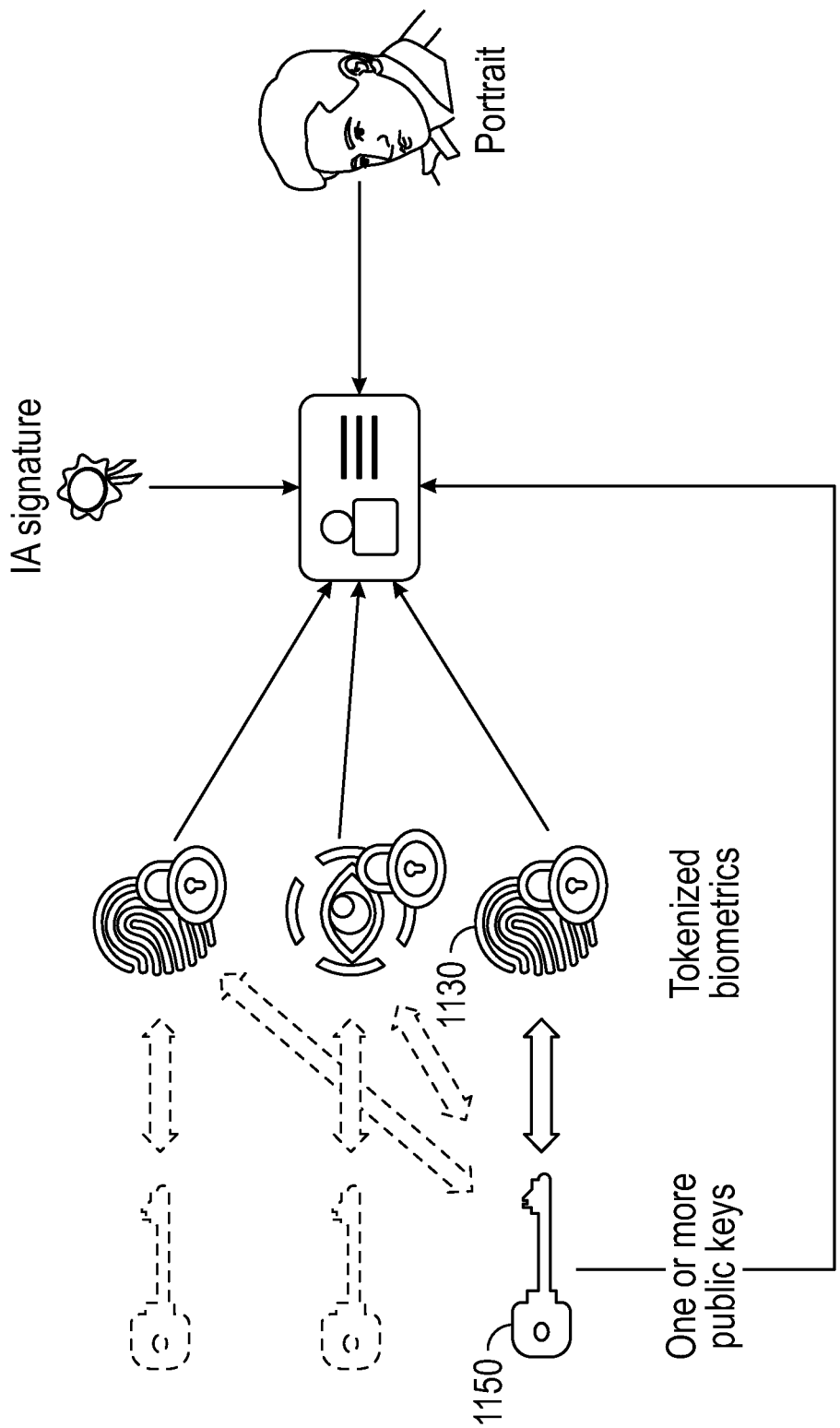
FIG. 11 is an illustration of another example of identity data that includes a biometrics token.

FIG. 11 is an illustration of another example of identity data that includes a biometrics token in identity data. The same private key is included in multiple biometrics tokens 1130, allowing only one public key 1150 to be stored in the identity data. In further examples, the biometrics token 1130 stores split keys that are private keys, and a combination of biometrics may be needed for identification. In variations, each biometrics token 1130 stores a different part of the private key of an authentication key pair and only one public key is stored in the identity data. Threshold cryptography can be leveraged for multi-modal biometric authentication, allowing it to choose a combination of biometric from multiple biometrics available on the credential device. For example, the threshold cryptography technique could choose combinations of face plus iris, face plus fingerprint, etc., resulting in different recovered keys part of the threshold cryptography where x of y keys are sufficient to validate the signature.

Figure 12:
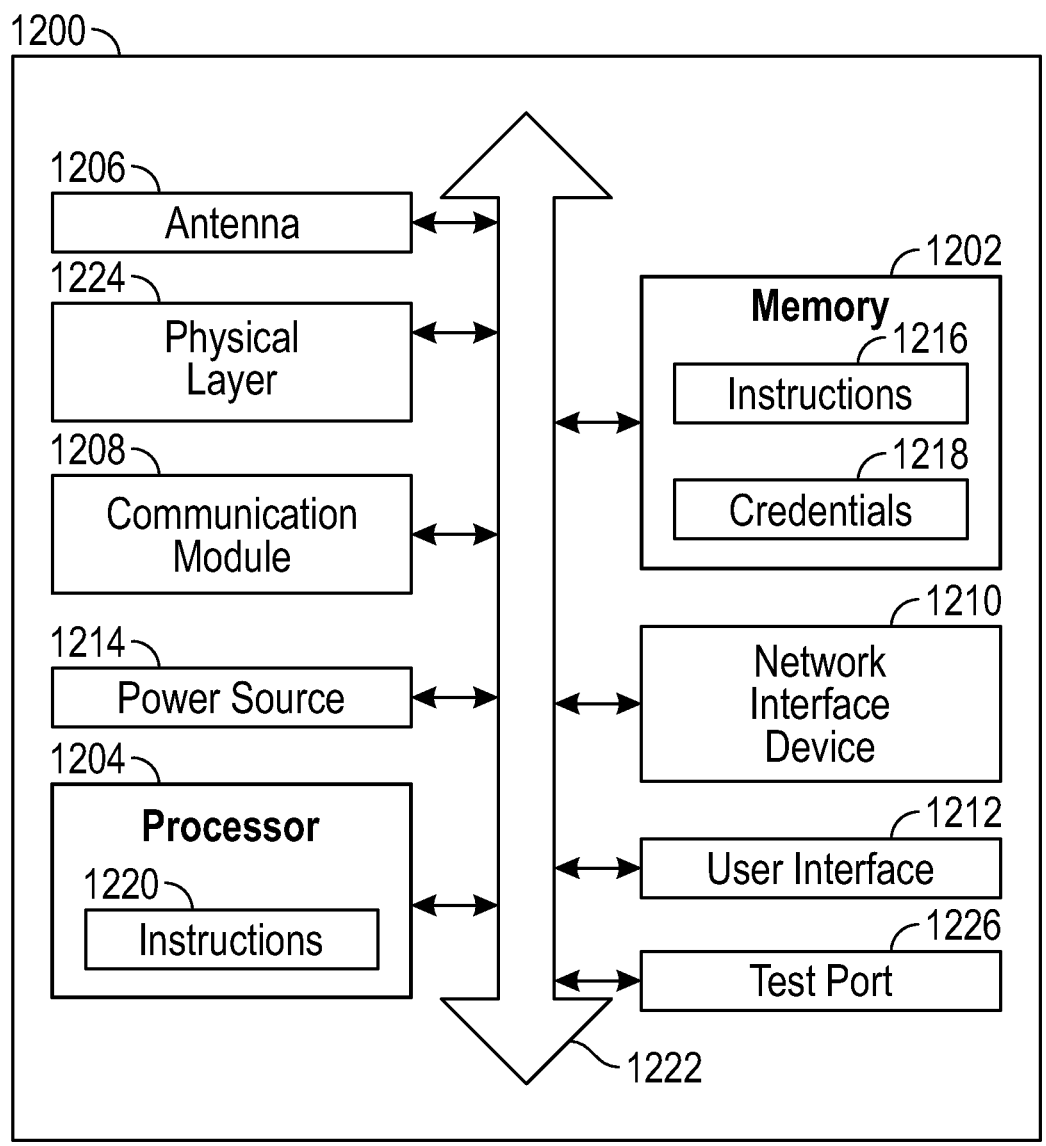
FIG. 12 is a block diagram schematic of portions of an example of a verifier device.

FIG. 12 is a block diagram schematic of various example components of a verifier device of an identity authentication system for supporting the device architectures described and illustrated herein. The device 1200 of FIG. 12 could be, for example, a verifier device that authenticates credential information of authority, status, rights, and/or entitlement to privileges for the holder of a credential device. At a basic level, a verifier device can include an interface (e.g., one or more antennas and Integrated Circuit (IC) chip(s)), which permits the verifier device to exchange data with another device, such as a credential device or a backend device of the authentication system. One example of a credential device is an RFID smartcard that has data stored thereon allowing a holder of the credential device to access a secure area or asset protected by the verifier device. Another example a credential device is a smartphone that includes an App to communicate with the verifier device.

With reference specifically to FIG. 12, additional examples of a verifier device 1200 for supporting the device architecture described and illustrated herein may generally include one or more of a memory 1202, a processor 1204, one or more antennas 1206, a communication port or communication module 1208, a network interface device 1210, a user interface 1212, and a power source 1214 or power supply.

Memory 1202 can be used in connection with the execution of application programming or instructions by processing circuitry, and for the temporary or long-term storage of program instructions or instruction sets 1216 and/or authorization data 1218, such as credential data, credential authorization data, or access control data or instructions, as well as any data, data structures, and/or computer-executable instructions needed or desired to support the above-described device architecture. For example, memory 1202 can contain executable instructions 1216 that are used by a processor 1204 of the processing circuitry to run other components of device 1200, to make access determinations based on credential or authorization data 1218, and/or to perform any of the functions or operations described herein, such as any of the method examples of FIG. 4, FIG. 7, and FIG. 8 for example. Memory 1202 can comprise a computer readable medium that can be any medium that can contain, store, communicate, or transport data, program code, or instructions for use by or in connection with device 1200. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Processor 1204 can correspond to one or more computer processing devices or resources. For instance, processor 1204 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 1204 can be provided as a microprocessor, Central Processing Unit (CPU), or plurality of microprocessors or CPUs that are configured to execute instructions sets stored in an internal memory 1220 and/or memory 1202.

Antenna 1206 can correspond to one or multiple antennas and can be configured to provide for wireless communications between device 1200 and another device. Antenna(s) 1206 can be coupled to one or more physical (PHY) layers 1224 to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. In an example, antenna 1206 may include one or more antennas coupled to one or more physical layers 1224 to operate using ultra-wide bandwidth (UWB) for in band activity/communication and Bluetooth (e.g., BLE) for out-of-band (OOB) activity/communication. However, any RFID or personal area network (PAN) technologies, such as the IEEE 502.15.1, near field communications (NFC), ZigBee, GSM, CDMA, Wi-Fi, etc., may alternatively or additionally be used for the OOB activity/communication described herein.

Device 1200 may additionally include a communication module 1208 and/or network interface device 1210. Communication module 1208 can be configured to communicate according to any suitable communications protocol with one or more different systems or devices either remote or local to device 1200. Network interface device 1210 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 1210 can include an Ethernet port or other physical jack, a Wi-Fi card, a Network Interface Card (NIC), a cellular interface (e.g., antenna, filters, and associated circuitry), or the like. In some examples, network interface device 1210 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 1206, communication module 1208, and/or network interface device 1210 or subcomponents thereof, may be integrated as a single module or device, function or operate as if they were a single module or device, or may comprise of elements that are shared between them.

User interface 1212 can include one or more input devices and/or display devices. Examples of suitable user input devices that can be included in user interface 1212 include, without limitation, one or more buttons, a keyboard, a mouse, a touch-sensitive surface, a stylus, a camera, a microphone, etc. Examples of suitable user output devices that can be included in user interface 1212 include, without limitation, one or more LEDs, an LCD panel, a display screen, a touchscreen, one or more lights, a speaker, etc. It should be appreciated that user interface 1212 can also include a combined user input and user output device, such as a touch-sensitive display or the like. Sensor 1226 may include a camera, and may be used to capture a biometric, such as a facial image for example.

Power source 1214 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 1200.

Device 1200 can also include one or more interlinks or buses 1222 operable to transmit communications between the various hardware components of the device. A system bus 1222 can be any of several types of commercially available bus structures or bus architectures.

ADDITIONAL DISCLOSURE AND EXAMPLES

Example 1 includes subject matter (such as a computing device implemented method of identity authentication) comprising, using a credential device, receiving a biometric token, performing a biometric capture of a user, converting the biometric capture into a biometric bitstream, recovering a predictable seed of data using the biometric bitstream and the biometric token, and using the recovered predictable seed of data to produce challenge response data sent to a verifier device in response to a challenge message received from a verifier device, and verifying the challenge response data using identity data of the user using a verifier device.

In Example 2, the subject matter of Example 1 optionally includes applying the biometric bitstream and the biometric token to an error correction code (ECC) algorithm to recover the predictable seed of data.

In Example 3, the subject matter of one or both of Examples 1 and 2 optionally includes recovering a signing key used to sign the challenge response data.

In Example 4, the subject matter of one or any combination of Examples 1-3 optionally includes recovering a split key used to sign the challenge response data.

In Example 5, the subject matter of Example 4 optionally includes the recovered split key being one of multiple split keys, and only a subset of the multiple split keys is needed for a valid signature of the challenge response data.

In Example 6, the subject matter of one or any combination of Examples 1-5 optionally includes verifying a digital signature of the challenge response data over a public key associated with the biometric token.

In Example 7, the subject matter of one or any combination of Examples 1-6 optionally includes verifying a digital signature over a public key included in the identity data of the user.

In Example 8, the subject matter of one or any combination of Examples 1-7 optionally includes sending identity data to the credential device when the identity of the user is verified.

In Example 9, the subject matter of one or any combination of Examples 1-8 optionally includes generating a split key on the credential device when the identity of the user is verified.

In Example 10, the subject matter of one or any combination of Examples 1-9 optionally includes generating a biometric token for a split key and storing the biometrics token on the credential device.

In Example 11, the subject matter of one or any combination of Examples 1-10 optionally includes producing another biometric capture of the user, converting the other biometric capture into a biometric bitstream, computing the biometric token using the biometric bitstream and secret data, and sending the biometric token to the credential device.

In Example 12, the subject matter of Example 11 optionally includes producing the other biometric capture using a stored biometric of the user.

In Example 13, the subject matter of one or any combination of Examples 1-12 optionally includes sending a request for provision of identity data from the verifier device and receiving the biometric token and the challenge message in response to the request.

In Example 14, the subject matter of one or any combination of Examples 1-13 includes communicating the request for provision of identity data, the biometric token, and the challenge message between the credential device and the verifier device via an Internet network.

Example 15 includes subject matter (such as a computing device implemented method of identity authentication) or can optionally be combined with one or any combination of Examples 1-14 to include such subject matter, comprising, using a credential device, transmitting a request message to verifier device, receiving a challenge message in response to the request message, performing a biometric capture of a user and converting the biometric capture into a biometric bitstream, recovering a signature key using the biometric bitstream and a biometric token stored in the credential device, using the recovered signature key to sign response data of a response to the challenge message, and sending the signed response data to the verifier device.

In Example 16, the subject matter of Example 15 optionally includes the verifier device verifying the response data and associating identification data of the credential device to a secured account using the verifier device.

In Example 17, the subject matter of one or both of Examples 15 and 16 optionally includes recovering a first split key using the biometric bitstream and the biometric token and signing the response data using the recovered first split key and a second split key stored in the credential device.

In Example 18, the subject matter of one or any combination of Examples 15-17 optionally includes recovering a first split key using the biometric bitstream and the biometric token, and signing the response data by threshold cryptography using the recovered first split key and a second split key stored in one of the credential device or an authentication server.

In Example 19, the subject matter of one or any combination of Examples 15-18 optionally includes communicating the request message and the challenge message between the credential device and the verifier device via an Internet network.

Example 20 includes subject matter, or can optionally be combined with one or any combination of Examples 1-19 to includes such subject matter, comprising a computer-readable storage medium including instructions that, when executed by processing circuitry of a credential device, cause the processing circuitry to perform acts comprising performing a biometric capture of a user and converting the biometric capture into a biometric bitstream, recovering a signature key using the biometric bitstream and a biometric token, using the recovered signature key to sign data to sign response data for a response to a challenge message, and sending the signed response data to the verifier device.

In Example 21, the subject matter of Example 20 optionally includes instructions to cause the processing circuitry to recover a first split key using the biometric bitstream and the biometric token and sign the response data using the recovered first split key and a second split key stored in the credential device.

In Example 22, the subject matter of one or both of Examples 20 and 21 optionally includes instructions to cause the processing circuitry to recover a first split key using the biometric bitstream and the biometric token, and sign the response data by threshold cryptography using the recovered first split key and a second split key stored in one of the credential device or an authentication server.

In Example 23, the subject matter of one or any combination of Examples 20-22 optionally includes instructions to cause the processing circuitry to send the request message and receive the challenge message via an Internet network.

The above Examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A computing device implemented method of identity authentication, the method comprising:
   using a credential device:
   receiving a biometric token, wherein the biometric token includes a predictable seed of data;
   performing a biometric capture of a user;
   converting the biometric capture into a biometric bitstream;
   recovering the predictable seed of data using the biometric bitstream and the biometric token;
   using the recovered predictable seed of data to produce challenge response data sent to a verifier device in response to a challenge message received from a verifier device; and
   using the verifier device:
   verifying the challenge response data using identity data of the user.

2. The method of claim 1, wherein the recovering the predictable seed of data includes applying the biometric bitstream and the biometric token to an error correction code (ECC) algorithm to recover the predictable seed of data.

3. The method of claim 1, wherein the recovering the predictable seed of data includes recovering a signing key used to sign the challenge response data.

4. The method of claim 1, wherein the recovering the predictable seed of data includes recovering a split key used to sign the challenge response data.

5. The method of claim 4, wherein the recovered split key is one of multiple split keys, and only a subset of the multiple split keys is needed for a valid signature of the challenge response data.

6. The method of claim 1, wherein verifying the challenge response data includes verifying a digital signature of the challenge response data over a public key associated with the biometric token.

7. The method of claim 1, wherein verifying the challenge response data includes verifying a digital signature over a public key included in the identity data of the user.

8. The method of claim 1, including sending identity data to the credential device when the identity of the user is verified.

9. The method of claim 1, including generating a split key on the credential device when the identity of the user is verified.

10. The method of claim 1, including generating the biometric token for a split key and storing the biometrics biometric token on the credential device.

11. The method of claim 1, including, using the verifier device:
    producing another biometric capture of the user;
    converting the other biometric capture into a biometric bitstream;
    computing the biometric token using the biometric bitstream and secret data; and
    sending the biometric token to the credential device.

12. The method of claim 11, wherein the producing another biometric capture includes producing the other biometric capture using a stored biometric of the user.

13. The method of claim 1, including, using the credential device:
    sending a request for provision of identity data from the verifier device; and
    receiving the biometric token and the challenge message in response to the request.

14. The method of claim 13, including communicating the request for provision of identity data, the biometric token, and the challenge message between the credential device and the verifier device via an Internet network.

15. A computing device implemented method of identity authentication, the method comprising:
    using a credential device:
    transmitting a request message to a verifier device;
    receiving a challenge message in response to the request message;
    performing a biometric capture of a user and converting the biometric capture into a biometric bitstream;
    recovering a signature key using the biometric bitstream and a biometric token stored in the credential device, wherein the biometric token includes the signature key;
    using the recovered signature key to sign response data of a response to the challenge message; and
    sending the signed response data to the verifier device.

16. The method of claim 15, including the verifier device verifying the response data and associating identification data of the credential device to a secured account using the verifier device.

17. The method of claim 15,
    wherein the recovering the signature key includes recovering a first split key using the biometric bitstream and the biometric token; and
    wherein signing the response data includes signing the response data using the recovered first split key and a second split key stored in the credential device.

18. The method of claim 15,
    wherein the recovering the signature key includes recovering a first split key using the biometric bitstream and the biometric token; and
    wherein signing the response data includes signing the response data by threshold cryptography using the recovered first split key and a second split key stored in one of the credential device or an authentication server.

19. The method of claim 15, wherein the request message and the challenge message are communicated between the credential device and the verifier device via an Internet network.

20. A non-transitory computer-readable storage medium including instructions that, when executed by processing circuitry of a credential device, cause the processing circuitry to perform acts comprising:
    performing a biometric capture of a user and converting the biometric capture into a biometric bitstream;
    recovering a signature key using the biometric bitstream and a biometric token, wherein the biometric token includes the signature key;

using the recovered signature key to sign data to sign response data for a response to a challenge message; and sending the signed response data to the verifier device.

\* \* \* \* \*